United States Patent Office 3,024,236
Patented Mar. 6, 1962

3,024,236
DERIVATIVES OF PYRIMIDINE AND
IMIDAZOLINE
William B. Hughes, Webster Groves, Mo., assignor to
Petrolite Corporation, Wilmington, Del., a corporation
of Delaware
No Drawing. Filed June 4, 1958, Ser. No. 739,660
8 Claims. (Cl. 260—256.4)

This invention relates to compounds containing at least two cyclic amidine rings joined together through the 1-position of said rings by means of the alkylene valence bonds of a methylene (substituted or unsubstituted) bis-amino alkylene radical; and to the process of preparing these compounds. This invention also relates to a process of employing these compounds as corrosion inhibitors in preventing the corrosion of metals, most particularly iron, steel and ferrous alloys.

Specific examples of the compounds of this invention include compounds which contain at least one of the following type linkages:

where the Ⓐ's (which can be the same or different) are cyclic amidine rings containing an aminoalkylene or a polyaminoalkylene radical on a side chain attached by means of alkylene valence bonds to the 1-positions of the cyclic amidine rings and an amino group of each ring is joined to the same carbon atom of a

radical whose remaining valences are satisfied by Y' and Y², which are groups which do not interfere with the amine-carbonyl condensation, for example, hydrogen or a hydrocarbon group such as alkyl, aryl, alkaryl, aralkyl, cycloalkyl, heterocyclic, radicals, etc. Preferably one of the Y's is hydrogen. Specific examples of these compounds comprise:

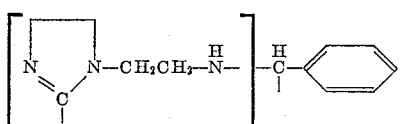

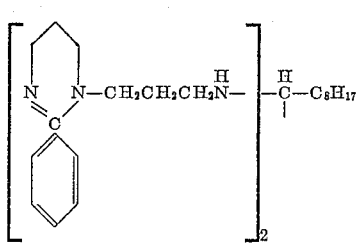

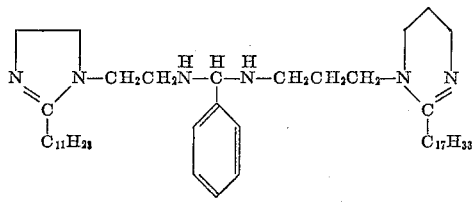

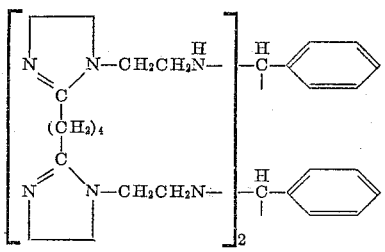

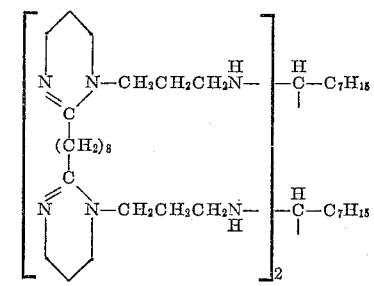

THE CYCLIC AMIDINE PRECURSOR

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages (the 1-position) is substituted with an amino-containing group capable of reacting with the carbonyl precursor to form the methylene bis compounds of this invention. This amino containing side group may be represented by $$-(XNR')_nH$$

wherein X is alkylene and R' is hydrogen or alkyl, but preferably hydrogen, and $n$ is a whole number, for example, 1–10 or higher, but preferably 1–3.

These cyclic amidines are further characterized as being imidazolines and tetrahydropyrimidines substituted in the 1-position with alkylene amino or polyalkylene amino groups in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. patents, U.S. No. 1,999,989, dated April 30, 1935, Max Bockmuhl et al.; U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem. Rev. 54, 593 (54).

Equally suitable for use in preparing compounds of my invention and for the preparation of tetrahydropyrimidines substituted in the 2-position are the polyamines containing at least one primary amino group and at least one secondary amino group, or another primary amino group separated from the first primary amino group by three carbon atoms instead of being separated by only 2 carbons as with imidazolines. This reaction as in the case of the imidazolines is generally carried out by heating the reactants to a temperature at which 2 moles of water are evolved for each carboxylic group and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Kiescher, Ernst Urech and Willi Klarer, and U.S. Patent No. 2,194,419, dated March 19, 1940, to August Chwala.

Substituted imidazolines and tetrahydropyrimidines are obtained from a variety of acids beginning with the one-carbon acid (formic) through and including higher fatty acids or the equivalent having for example 32 carbon atoms. Modified fatty acids also can be employed as, for example, phenyl stearic acid or the like. Cyclic acids may be employed, including naphthenic acids. A variety of other acids including benzoic acid, substituted benzoic acid, salicyclic acid, and the like, have been employed to furnish the residue

from the acid RCOOH in which the C of the residue

is part of the ring. The fatty acids employed, for example, may be saturated or unsaturated. They may be hydroxylated or nonhydroxylated. Branched long chain fatty acids may be employed. See J. Am. Chem. Soc. 74, 2523 (1952). This applies also to the lower molecular weight acids as well.

Among sources of such acids may be mentioned straight chain and branched chain, saturated and unsaturated, aliphatic, cycloaliphatic, aromatic, hydroaromatic, aralkyl acids, etc.

Examples of saturated aliphatic monocarboxylic acids comprise: acetic, proprionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octadecenoic acids, for example, petrosilenic acid, oleic acid, elaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids comprise glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyl lactic acid, acetyl ricinoleic acid, chloroacetyl ricinoleic acid, and the like.

Examples of the cyclc aliphatic carboxylic acids comprise those found in petroleum called naphthenic acids, hydnocarpic and chaumoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acid, phenyl benzoic acid, naphthalene carboxylic acid, and the like.

Mixed higher fatty acids derived from animal or vegetable sources, for example, lard, coocanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid etc.

Examples of the polycarboxylic acids comprise those of the aliphatic series, for example, oxalic malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesocenic, citraconic, glutonic, itaconic, muconic, acenitic acids, and the like.

Examples of aromatic polycarboxylic acids comprise phthalic, isophthalic acids, terephthalic acids, substituted derivatives thereof, (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and poly acids, for example, diricinoleic acid, triricinoleic acid, polyricinoleic acid, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

Thus, cyclic amidines within the scope of this invention include compounds of the formulae:

(1) 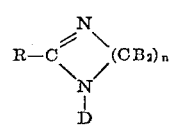

(2) 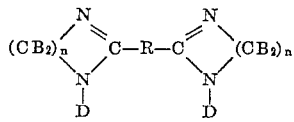

where $R\overset{\parallel}{C}-$ and $=C-R-C=$ are the residues derived from the carboxylic acid, where R is a hydrocarbon radical having, for example, 1–30 carbon atoms, but preferably 9 to 20 carbons, and hydrocarbons in which the carbon atom chain is interrupted by oxygen, etc., $n$ is 2 or 3; and B is a hydrogen or a hydrocarbon radical, for example, an alkyl radical; and D is an aminoalkylene radical, for example $(XNR')_nH$ wherein X is alkylene and R' is hydrogen or alkyl and is a whole number, for example, 1–10, but preferably 1–3, and $(CB_2)_n$ is, for example, a divalent radical of the formula:

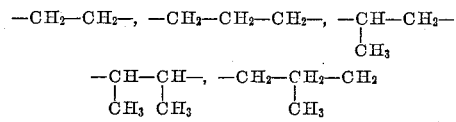

etc.

The most advantageously employed compounds are the imidazolines having a primary amino group, for example —$CH_2CH_2NH_2$, in the 1-position and a hydrocarbon group having 7–20 carbons substituted in the 2-position.

The following tables present examples of amino cyclic amidines which can be employed in the present invention. Actually, substituted cyclic amidines can be obtained from a variety of polyamines but only in the instance where one starts with a triamine or higher amine is there a residual group having a primary amino radical as herein required. This does not mean, however, that one could not start with ethylene diamine or with 1,2-propylene diamine. The cyclic compounds so obtained could be reacted with a mole of ethylene imine or propylene imine so as to introduce the terminal primary amino group. From a practical standpoint, however, the most readily available polyamines are diethylene triamine, triethylene tetramine, and tetra-ethylene pentamine. No particular advantage has been found in using other polyamines in which some other divalent radical, such as

appears. For this reason examples in Table 1 are limited to derivatives of the three most readily available polyamines above indicated.

TABLE 1

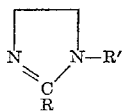

| Ex. | RCOOH source of RC | R' |
|---|---|---|
| 1a | Formic | $CH_2CH_2NH_2$ |
| 2a | Propionic | $CH_2CH_2NH_2$ |
| 3a | Isovaleric | $CH_2CH_2NH_2$ |
| 4a | Stearic | $CH_2CH_2NH_2$ |
| 5a | Melissic | $CH_2CH_2NH_2$ |
| 6a | Phenyl Stearic | $CH_2CH_2NH_2$ |
| 7a | Salicylic | $CH_2CH_2NH_2$ |
| 8a | Cresotinic | $CH_2CH_2NH_2$ |
| 9a | Naphthenic | $CH_2CH_2NH_2$ |
| 10a | Oleic | $CH_2CH_2NH_2$ |
| 11a | Acetic | $CH_2CH_2NHCH_2CH_2NH_2$ |
| 12a | Pelargonic | $CH_2CH_2NHCH_2CH_2NH_2$ |
| 13a | Lauric | $CH_2CH_2NHCH_2CH_2NH_2$ |
| 14a | Palmitic | $CH_2CH_2NHCH_2CH_2NH_2$ |
| 15a | Cerotic | $CH_2CH_2NHCH_2CH_2NH_2$ |
| 16a | p-tert-Butyl benzoic | $CH_2CH_2NHCH_2CH_2NH_2$ |
| 17a | p-Hydroxybenzoic | $CH_2CH_2NHCH_2CH_2NH_2$ |
| 18a | Salicylic | $CH_2CH_2NHCH_2CH_2NH_2$ |

TABLE 1—Continued.

| Ex. | RCOOH source of RC | R' |
|---|---|---|
| 19a | Hydroxy naphthenic | $CH_2CH_2NHCH_2CH_2NH_2$ |
| 10a | Benzoic | $CH_2CH_2NHCH_2CH_2NH_2$ |
| 21a | Formic | $CH_2CH_2NHCH_2CH_2NHCH_2CH_2NH_2$ |
| 22a | Methyloctadecanoic | $CH_2CH_2NHCH_2CH_2NHCH_2CH_2NH_2$ |
| 23a | Capric | $CH_2CH_2NHCH_2CH_2NHCH_2CH_2NH_2$ |
| 24a | Stearic | $CH_2CH_2NHCH_2CH_2NHCH_2CH_2NH_2$ |
| 25a | Phenylstearic | $CH_2CH_2NHCH_2CH_2NHCH_2CH_2NH_2$ |
| 26a | Cresotinic | $CH_2CH_2NHCH_2CH_2NHCH_2CH_2NH_2$ |
| 27a | Linoleic | $CH_2CH_2NHCH_2CH_2NHCH_2CH_2NH_2$ |
| 28a | Salicylic | $CH_2CH_2NHCH_2CH_2NHCH_2CH_2NH_2$ |
| 29a | 2-hydroxy-3-methoxy-benzoic | $CH_2CH_2NHCH_2CH_2NHCH_2CH_2NH_2$ |
| 30a | Naphthenic | $CH_2CH_2NHCH_2CH_2NHCH_2CH_2NH_2$ |

The only polyamine available on a large scale for the manufacture of tetrahydropyrimides is 3,3'-iminobispropylamine. This product can be converted into the tetramine or pentamine by appropriate reaction with a suitable imine or by reaction with acrylonitrile, followed by the usual steps of converting the intermediate into the amine. The tetrahydropyrimidines comparable to the substituted amidines in Table 1, appear in Table 2 immediately following.

TABLE 2

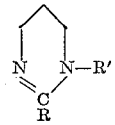

| Ex. | RCOOH source of RC | R' |
|---|---|---|
| 1b | Formic | $CH_2CH_2CH_2NH_2$ |
| 2b | Acetic | $CH_2CH_2CH_2NH_2$ |
| 3b | Butyric | $CH_2CH_2CH_2NH_2$ |
| 4b | Valeric | $CH_2CH_2CH_2NH_2$ |
| 5b | Isovaleric | $CH_2CH_2CH_2NH_2$ |
| 6b | Trimethyl acetic | $CH_2CH_2CH_2NH_2$ |
| 7b | Pelargonic | $CH_2CH_2CH_2NH_2$ |
| 8b | Lauric | $CH_2CH_2CH_2NH_2$ |
| 9b | Stearic | $CH_2CH_2CH_2NH_2$ |
| 10b | Arachidic | $CH_2CH_2CH_2NH_2$ |
| 11b | Eucosane-carboxylic | $CH_2CH_2CH_2NH_2$ |
| 12b | Cerotic | $CH_2CH_2CH_2NH_2$ |
| 13b | Melissic | $CH_2CH_2CH_2NH_2$ |
| 14b | Phenylstearic | $CH_2CH_2CH_2NH_2$ |
| 15b | Benzoic | $CH_2CH_2CH_2NH_2$ |
| 16b | Salicylic | $CH_2CH_2CH_2NH_2$ |
| 17b | Cresotinic | $CH_2CH_2CH_2NH_2$ |
| 18b | p-Hydroxybenzoic | $CH_2CH_2CH_2NH_2$ |
| 19b | p-tert-Butylbenzoic | $CH_2CH_2CH_2NH_2$ |
| 20b | 2-hydroxy-3-methoxy benzoic | $CH_2CH_2CH_2NH_2$ |
| 21b | Oleic | $CH_2CH_2CH_2NH_2$ |
| 22b | Undecylenic | $CH_2CH_2CH_2NH_2$ |
| 23b | Linoleic | $CH_2CH_2CH_2NH_2$ |
| 24b | Hydroxybutyric | $CH_2CH_2CH_2NH_2$ |
| 25b | Methyloctadecanoic | $CH_2CH_2CH_2NH_2$ |

Suitable products derived from the three amines previously noted are described in Table 3, following:

TABLE 3

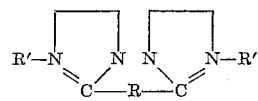

| Ex. No. | HOOC—R—COOH source of —CRC— | R' |
|---|---|---|
| 1c | Dilinoleic | $CH_2CH_2NH_2$ |
| 2c | Adipic | $CH_2CH_2NH_2$ |
| 3c | Suberic | $CH_2CH_2NH_2$ |
| 4c | Sebacic | $CH_2CH_2NH_2$ |
| 5c | Nonodecane dicarboxylic | $CH_2CH_2NH_2$ |
| 6c | Diglycolic | $CH_2CH_2NH_2$ |
| 7c | Ethylene bis (glycolic) | $CH_2CH_2NH_2$ |
| 8c | Methylene disalicylic | $CH_2CH_2NH_2$ |
| 9c | Stearyl Malonic | $CH_2CH_2NH_2$ |
| 10c | Phthalic | $CH_2CH_2NH_2$ |
| 11c | Succinic | $CH_2CH_2NHCH_2CH_2NH_2$ |
| 12c | Glutaric | $CH_2CH_2NHCH_2CH_2NH_2$ |
| 13c | Pimelic | $CH_2CH_2NHCH_2CH_2NH_2$ |
| 14c | Azelaic | $CH_2CH_2NHCH_2CH_2NH_2$ |
| 15c | Eicosane dicarboxylic | $CH_2CH_2NHCH_2CH_2NH_2$ |
| 16c | Dilinoleic | $CH_2CH_2NHCH_2CH_2NH_2$ |

TABLE 3—Continued.

| Ex. No. | HOOC—R—COOH source of—CRC— | R' |
|---|---|---|
| 17c | Isophthalic | $CH_2CH_2NHCH_2CH_2NH_2$ |
| 18c | Diglycolic | $CH_2CH_2NHCH_2CH_2NH_2$ |
| 19c | Lauryl malonic | $CH_2CH_2NHCH_2CH_2NH_2$ |
| 20c | Methylene disalicylic | $CH_2CH_2NHCH_2CH_2NH_2$ |
| 21c | Dilinoleic | $CH_2CH_2NHCH_2CH_2NHCH_2CH_2NH_2$ |
| 22c | Succinic | $CH_2CH_2NHCH_2CH_2NHCH_2CH_2NH_2$ |
| 23c | Suberic | $CH_2CH_2NHCH_2CH_2NHCH_2CH_2NH_2$ |
| 24c | Pimelic | $CH_2CH_2NHCH_2CH_2NHCH_2CH_2NH_2$ |
| 25c | Nonodecane dicarboxylic | $CH_2CH_2NHCH_2CH_2NHCH_2CH_2NH_2$ |
| 26c | Diglycolic | $CH_2CH_2NHCH_2CH_2NHCH_2CH_2NH_2$ |
| 27c | Methylene disalicylic | $CH_2CH_2NHCH_2CH_2NHCH_2CH_2NH_2$ |
| 28c | Stearyl malonic | $CH_2CH_2NHCH_2CH_2NHCH_2CH_2NH_2$ |
| 29c | Stearyl succinic | $CH_2CH_2NHCH_2CH_2NHCH_2CH_2NH_2$ |
| 30c | Terephthalic | $CH_2CH_2NHCH^2CH_2NHCH_2CH_2NH_2$ |

In the use of dicarboxy acids, the bulk of the examples were obtained from 3,3'-iminobispropylamine. These compounds are comparable to those which appeared in Table 3, preceding.

TABLE 4

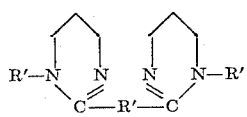

| Ex. No. | HOOC—R—COOH Source of—CRC— | R' |
|---|---|---|
| 1d | Maleic | $CH_2CH_2CH_2NH_2$ |
| 2d | Succinic | $CH_2CH_2CH_2NH_2$ |
| 3d | Glutaric | $CH_2CH_2CH_2NH_2$ |
| 4d | Adipic | $CH_2CH_2CH_2NH_2$ |
| 5d | Suberic | $CH_2CH_2CH_2NH_2$ |
| 6d | Sebacic | $CH_2CH_2CH_2NH_2$ |
| 7d | Pimelic | $CH_2CH_2CH_2NH_2$ |
| 8d | Azelaic | $CH_2CH_2CH_2NH_2$ |
| 9d | Nonodecane dicarboxylic | $CH_2CH_2CH_2NH_2$ |
| 10d | Eicosane dicarboxylic | $CH_2CH_2CH_2NH_2$ |
| 11d | Diglycolic | $CH_2CH_2CH_2NH_2$ |
| 12d | Ethylene bisglycolic | $CH_2CH_2CH_2NH_2$ |
| 13d | Methylene disalicylic | $CH_2CH_2CH_2NH_2$ |
| 14d | Dilinoleic | $CH_2CH_2CH_2NH_2$ |
| 15d | Stearyl malonic | $CH_2CH_2CH_2NH_2$ |
| 16d | Lauryl succinic | $CH_2CH_2CH_2NH_2$ |
| 17d | Isotetradecyl succinic | $CH_2CH_2CH_2NH_2$ |
| 18d | Phthalic | $CH_2CH_2CH_2NH_2$ |
| 19d | Isophthalic | $CH_2CH_2CH_2NH_2$ |
| 20d | Terephathalic | $CH_2CH_2CH_2NH_2$ |
| 21d | Glutaconic | $CH_2CH_2CH_2NH_2$ |

THE CARBONYL PRECURSOR

The carbonyl precursors of this invention are carbonyl compounds capable of reacting with aminoalkylene or polyaminoalkylene cyclic amidines to form the methylene bis compounds of this invention. In general, they comprise aldehydes and ketones, for example, of the formula

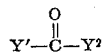

in which Y' and Y² separately comprise hydrogen; alkyl groups, for example, methyl, ethyl, propyl, isopropyl, butyl, isobutyl, pentyl, isopentyl, hexyl, isohexyl, octodecyl, etc; cycloalkyl groups, for example, cyclohexyl, cycloheptyl, including the methyl, ethyl, propyl, butyl, pentyl, and hexyl substituted cycloalkyls; aryl groups, for example phenyl, naphthyl, etc., including the methyl, ethyl, propyl, butyl, octadecyl, etc. substituted aryl groups. Y' and Y² may be the same or different. Where an aldehyde, except for formaldehyde, is employed as the carbonyl precursor one of these groups is H. Where a ketone is employed, neither of the groups is hydrogen.

Thus, the reactant herein specified as a carbonyl compound utilized in the formation of the present product may be an aldehyde or ketone, aliphatic, or cyclic, and of either saturated or unsaturated structure; the cyclic compounds may be either naphthenic or aromatic. Suitable ketones include such saturated members as acetone, methylethyl ketone, etc.; cyclic saturated ketones, such as methylcyclohexyl ketone; cyclic members wherein the carbonyl group is part of the ring, such as benzoquinone, cyclohexanone; unsaturated ketones, such as vinyl methyl ketone, ethylideneacetone, mesityl oxide, isophorone, etc.; aryl ketones, such as acetophenone, butyrophenone, etc.; alkenyl arylketones, such as propenyl phenyl ketone; polyketones, such as diacetyl or benzil and homologs of the above classes. Typical aldehydes of the corresponding classes enumerated above include such compounds as formaldehyde and acetaldehyde of the saturated aliphatic series, crotonaldehyde or acrolein of the unsaturated aliphatic series, benzaldehyde of the arylaldehydes, and heterocyclic aldehydes such as furfural. The polymers of formaldehyde such as trioxymethylene are particularly useful since the latter are liquid at relatively high temperatures and depolymerize during the reaction to yield the highly active carbonyl compound, formaldehyde. The aldehydes and ketones may also be employed in admixture with each other or several members of the same group may be used together. The carbonyl reactant may also contain other diverse radicals in addition to the carbonyl group in the structure of the compound provided they do not enter into or affect the reaction.

The carbonyl compound most advantageously employed is an aldehyde since it reacts much more readily with the amino cyclic amidine.

In addition, dicarbonyl compounds such as benzenedialdehyde, succinic dialdehyde, etc., can also be employed.

METHYLENE BIS AMINO ALKYLENE CYCLIC AMIDINES PRODUCTS

In general, the bis product is prepared by reacting the cyclic amidine with the carbonyl compound in ratios of at least two equivalents of aminoalkylene groups per equivalent of carbonyl group under condensing conditions (i.e. so that one equivalent of water is removed per equivalent of carbonyl group).

A broad temperature range can be employed in carrying out the reaction. When the amine and carbonyl compound are mixed the reaction commences even at room temperature, although it is desirable to heat the mixture in order to speed up the reaction and insure that it goes to completion. Temperatures of 20 to 180° C., or higher, but preferably 80 to 100° C., and times of ½ to 3 hours, or longer, but preferably 1 to 1½ hours can be employed. Of course, there is an interrelation of time and temperature so that a longer time can be employed with a lower temperature and vice versa. When a ketone is employed instead of an aldehyde, the reaction is slower, even though more drastic conditions are employed, such as higher temperatures, catalysts, etc., and the yields are lower. Therefore, the aldehyde is most advantageously employed.

The condensation reaction may be conducted in the presence of a solvent for the reactants, the solvent tending to modify the rate of reaction and the character of the products obtained therefrom. In general, the aliphatic alcohols such as butyl alcohol, ethers, such as diethylether, esters, such as ethylacetate and hydrocarbon solvents such as benzene, toluene, etc. provide suitable solvents or diluents in which to conduct the reaction. The solvent may be added for the specific purpose of controlling the rate of reaction, as for example, where a solvent is chosen which vaporizes at the reaction temperature and thus maintains the temperature of the reaction at the boiling point of the solvent. The solvent may also form an azeotrope with the by-product water formed in the reaction and thus provide an effective means for removing the latter undesirable product from the reaction mixture.

The preferred method of preparing the bis products is illustrated by the following examples. In these examples one equivalent of carbonyl compound was employed for two equivalents of the amino compound i.e. 1 mole of carbonyl group for each 2 moles of terminal amino group.

Example I

Two moles of

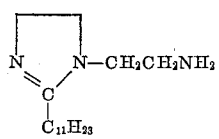

are added to one mole of heptaldehyde in 250 ml. of isopropyl alcohol over about ½ hour. Thereupon the solution is heated to reflux and held there for about one hour. At the end of this period about 500 ml. of heptane are added and the mixture allowed to cool. The crystals formed on cooling are filtered and then recrystallized from heptane.

Example II

The process of the above example is repeated employing benzaldehyde in place of heptaldehyde and 250 ml. of heptane in place of isopropanol. The product is crystallized from the heptane.

In order to save repetitive detail, a list of bis compounds prepared by the above procedure is presented in the following table.

TABLE 5

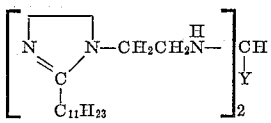

| Ex. | Y | Melting point, degrees | Molecular weight | |
|---|---|---|---|---|
| | | | Found | Calculated |
| 1 | H | | | |
| 2 | ⌬— | 109-110 | 609 | 615 |
| 3 | CH₃(CH₂)₃—CH—<br>C₂H₅ | 88- 89 | 731 | 740 |
| 4 | CH₃(CH₂)₄— | 65- 66 | 618 | 624 |
| 5 | (CH₃)₂—(CH₂)₃— | 81- 83 | 667 | 682 |

In addition, the following compounds are simillarly prepared. The amino cyclic amidines indicated refer to those shown in Tables 1–4.

TABLE 6

| Ex. | Cyclic amidine | Aldehyde |
|---|---|---|
| 6 | 2a | Acetaldehyde. |
| 7 | 4a | Do. |
| 8 | 6a | Do. |
| 9 | 7a | Do. |
| 10 | 10a | Do. |
| 11 | 2a | Heptaldehyde. |
| 12 | 4a | Do. |
| 13 | 6a | Do. |
| 14 | 7a | Do. |
| 15 | 10a | Do. |
| 16 | 2a | Stearaldehyde. |
| 17 | 4a | Do. |
| 18 | 6a | Do. |
| 19 | 7a | Do. |
| 20 | 10a | Do. |
| 21 | 2a | Salicylaldehyde. |
| 22 | 4a | Do. |
| 23 | 6a | Do. |
| 24 | 7a | Do. |
| 25 | 10a | Do. |
| 26 | 2a | Benzaldehyde. |
| 27 | 4a | Do. |
| 28 | 6a | Do. |
| 29 | 7a | Do. |
| 30 | 10a | Do. |
| 31 | 2a | Isodecaldehyde ((CH₃)₂—CH—(CH₂)₆—CHO). |
| 32 | 4a | Do. |
| 33 | 6a | Do. |
| 34 | 7a | Do. |
| 35 | 10a | Do. |
| 36 | 13a | Heptaldehyde. |

TABLE 6—Continued.

| Ex. | Cyclic amidine | Aldehyde |
|---|---|---|
| 37 | 13a | Stearaldehyde. |
| 38 | 13a | Benzaldehyde. |
| 39 | 13a | Salicylaldehyde. |
| 40 | 20a | Heptaldehyde. |
| 41 | 20a | Stearaldehyde. |
| 42 | 20a | Benzaldehyde. |
| 43 | 20a | Salicylaldehyde. |
| 44 | 2b | Heptaldehyde. |
| 45 | 2b | Stearaldehyde. |
| 46 | 2b | Benzaldehyde. |
| 47 | 2b | Salicylaldehyde. |
| 48 | 21b | Heptaldehyde. |
| 49 | 21b | Stearaldehyde. |
| 50 | 21b | Benzaldehyde. |
| 51 | 21b | Salicylaldehyde. |
| 52 | 21b | Isodecaldehyde. |
| 53 | 3c | Heptaldehyde. |
| 54 | 3c | Benzaldehyde. |
| 55 | 2d | Heptaldehyde. |
| 56 | 2d | Benzaldehyde. |

Thus, the compounds of the present invention can be described by the formulae:

(1) 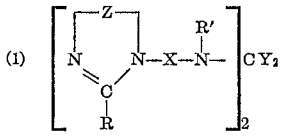

(2) 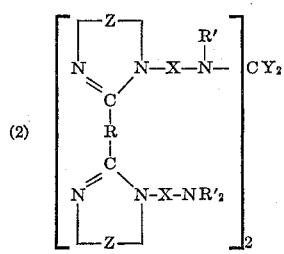

(3) 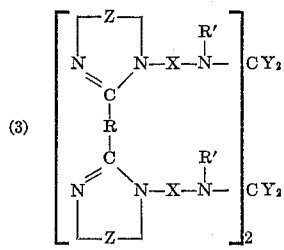

(4) 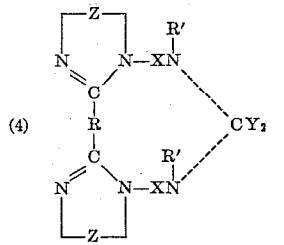

(the dotted lines indicating a possible polymeric structure), in which

and =C—R—C= are the residual radicals derived from the carboxylic acids

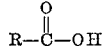

or

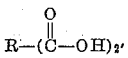

where R comprises, for example, a saturated or unsaturated aliphatic radical, a cycloaliphatic radical, an aryl radical, an aralkyl radical, an alkaryl radical, an alkoxyalkyl radical, an aryloxyalkyl radical, and the like; and Z is an alkylene group, for example, ethylene and propylene radicals such as

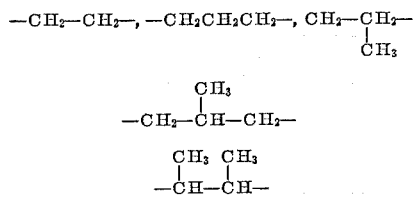

X is an alkylene radical, preferably having a main chain of 2–3 carbons, and Y is hydrogen, a hydrocarbon radical, for example, alkyl, aryl, cycloalkyl, etc. and R' is hydrogen, alkyl, etc.

USE OF CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658, dated February 28, 1954, to Pfohl et al., and 2,756,211, dated July 24, 1956, to Jones, and 2,727,003, dated December 13, 1955, to Hughes.

More specifically then, and particularly from the standpoint of oil production, this aspect of the invention relates to inhibiting corrosion caused by hydrogen sulfide, carbon dioxide, inorganic and organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it is possible to effectively control corrosion by the addition of as little as 5 p.p.m. of my new compositions to the well fluids, whereas in other wells, it is necessary to add 200 p.p.m. or more.

In using my improved compositions for protecting oil well tubing, casing and other equipment which comes in contact with the corrosive oil-brine production, I find that excellent results may be obtained by injecting an appropriate quantity of a selected composition into a producing well so that it mingles with the oil-brine mixture and comes into contact with the casing, tubing, pumps and other producing equipment. I can, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out my process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic and organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it is dropped into the well as a solid lump or stick, blown in as a powder with gas, or washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equilizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in my process varies with the corrosiveness of the system, but where a continuous or semi-continuous treating procedure is carried out as described above, the addition of reagent in the proportion of from 5 parts per million to 1000 parts per million or more parts of corrosive fluid will generally provide protection.

These corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Patent No. 23,227. When the herein described products are mixed with corrosion inhibtors of the conventional type in the ratio of one-to-three, one-to-one, three-to-one, or the like, in numerous instances the effectiveness of the corrosion inhibitor thus obtained is often significantly greater than the use of either one alone.

Since these products are basic they can be combined with various acids to produce salts in which oil solubility is increased or decreased. Likewise, water solubility is increased or decreased. For instance, the products are mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obviously introduce hydophile character when they form salts or complexes, if complexes are formed. For example, any of the acids described above in preparing the cyclic amidines are useful in preparing these salts.

As pointed out previously, the addition of corrosion inhibitors, particularly in the form of a solution by means of a metering pump or the like, is common practice. The particular corrosion inhibtors herein described are applied in the same manner as other corrosion inhibitors intended for use for the same purpose. As to the use of the corrosion inhibitor, a solution of it can be prepared in a suitable solvent such as mineral oil, methyl ethyl ketone, xylene, kerosene, high boiling aromatic solvent, or even water.

The following examples are presented to illustrate the superiority of the instant compounds as corrosion inhibitors.

*Static weight loss tests.*—These tests are used to test both synthetic and naturally occurring fluids. The test procedure involves the measurement of the corrosive action of the fluids inhibited by the compositions herein described upon sand-blasted S.A.E. 1020 steel coupons measuring ⅞ x 3¼ inches under conditions approximating those found in an actual producing well, and the comparison thereof with results obtained by subjecting identical test coupons to the corrosive action of the identical fluids containing no inhibitor.

In the present tests clean pint bottles are charged with 200 ml. of 10% sodium chloride solution saturated with hydrogen sulfide and 200 ml. of mineral spirits adjusted to a pH of 6.6 with acetic acid and a redox potential of −380 with ammonium sulfide and a predetermined amount of inhibitor is then added. In all cases the inhibitor concentration is based on the total volume of fluid. Weighed coupons are then added, the bottles tightly sealed and allowed to remain at room temperature for 3 days. The coupons are then removed, cleaned by immersion in inhibited 10% hydrochloric acid, dried and weighed.

The changes in the weight of the coupons during the corrosion test are taken as a measurement of the effectiveness of the inhibitor compositions. Protection percentages are calculated for each test coupon taken from the inhibited fluids in accordance with the following formula:

$$\frac{L_1-L_2}{L_1} \times 100 = \text{percent protection}$$

in which $L_1$ is the loss of weight of the coupons taken from uninhibited fluids and $L_2$ is the loss in weight of coupons which are subjected to the inhibited fluids.

TABLE 7
[100 p.p.m.]

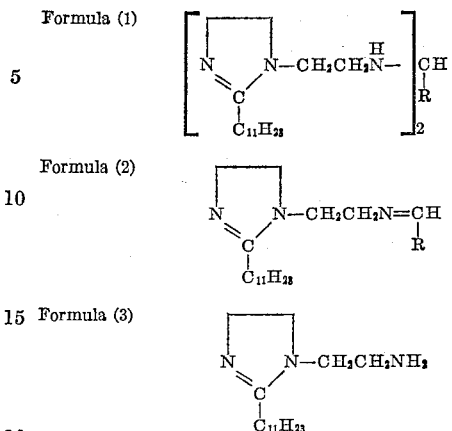

| Test | Formula | R | Melting point, °C. | Molecular wgt. Found | Molecular wgt. Calculated | Percent protection |
|---|---|---|---|---|---|---|
| 1 | 1 | H | | | | 81.3 |
| 2 | 1 | ⌬ (phenyl) | 109–110 | 609 | 615 | 85.5 |
| 3 | 1 | CH₃(CH₂)₃—CH(C₂H₅)— | 88–89 | 731 | 740 | 90.9 |
| 4 | 1 | CH₃(CH₂)₄— | 65–66 | 618 | 624 | 94.3 |
| 5 | 1 | (CH₃)₂—(CH₂)₇— | 81–83 | 667 | 682 | 91.3 |
| 6 | 3 | | 61–64 | | | 64.0 |
| 7 | 2 | CH₃—(CH₂)₃—CH(C₂H₅)— | | | | 69.8 |
| 8 | 2 | CH₃(CH₂)₄— | | | | 72.3 |

The superiority of the compounds of this invention are evident from the above table. This result is unexpected since the amino imidazoline itself, or the amino imidazoline reacted with 1 mole of aldehyde per mole of amino imidazoline is far less active than the bis compound of this invention (1 mole of aldehyde per 2 moles of aminoimidazoline).

OTHER USES

These products are effective not only as corrosion inhibitors but can be used for a number of other purposes. For instance, they are useful as asphalt additives to increase the adhesiveness of the asphalt to the mineral aggregates. In the form of water soluble salts, they are useful as bactericides in the secondary recovery of oil. Where they contain oxyalkylation susceptible groups, they can be subjected to extensive oxyalkylation by means of ethylene oxide, propylene oxide, butylene oxide, octylene oxide, etc. These are oxyalkylated and still have oil solubility as, for example, by the addition of propylene oxide or butylene oxide, or are oxyalkylated to produce water solubility as, for example, by means of ethylene oxide or glycide. They are also oxyalkylated by combinations of propylene oxide and ethylene oxide so that both water solubility and oil solubility remain. Such products are useful for a variety of purposes and particularly for those where nonionic surfactants or sequestered cationic surfactants are indicated.

In addition, the present compounds, or the oxyalkylated derivatives thereof and salts of either have the following applications:

As demulsifiers and desalters for water-in-oil emulsions; as demulsifiers for oil-in-water emulsions; as fuel oil additives for gasoline, diesel fuel, jet fuel, and the like; as lubricating oil additives; as scale preventatives; as chelating agents or to form chelates which are themselves useful, for example, as anti-oxidants, fungicides, etc.; as flotation agents, for example, as flotation collection agents; as additives for compositions useful in acidizing calcareous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as an entraining agent for concrete and cements; as anti-static agents for rugs, floors, upholstery, plastic and wax polishes, textiles, etc; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers; in preventing water-spotting in lacquer; as anti-skinners for pigment flushing, grinding and dispersing; as antifeathering agents in ink; as agents in the preparation of wood pulp and pulp slurries; as emulsifiers for insecticidal compositions and agricultural sprays such as DDT, 24–D (Toxaphene), chlordan, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

Having thus described my invention, what I claim as new and desire to obtain by Letters Patent is:

1. A compound of the formula $$\left[\begin{array}{c}\overbrace{N\phantom{xxx}N}^{(CB_2)_{2-3}}\!-\!\left[(CB_2)_{2-3}\!-\!\overset{H}{N}\right]_n\!-\!\overset{H}{\underset{Y^1}{C}}\!-\!Y^2\\ \underset{R}{C}\end{array}\right]_2$$

where R is selected from the group consisting of hydrogen and a hydrocarbon group, B is a member selected from the group consisting of hydrogen and lower alkyl, $n$ is an integer, and $Y^1$ and $Y^2$ are selected from the group consisting of hydrogen and hydrocarbon group.

2. A compound of the formula $$\left[\begin{array}{c}\overbrace{N\phantom{xxx}N}^{(CB_2)_{2-3}}\!-\!\left[(CB_2)_{2-3}\!-\!\overset{H}{N}\right]_n\!-\!\overset{H}{\underset{Y}{C}}\!-\!Y\\ \underset{R}{C}\end{array}\right]_2$$

where R and Y are hydrocarbon groups having 1–30 carbon atoms, B is selected from the group consisting of hydrogen and a lower alkyl group, and $n$ is an integer.

3.

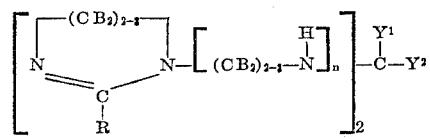

where R and Y are hydrocarbon radicals having 1–30 carbon atoms.

4.

where R and Y are hydrocarbon radicals having 1–30 carbon atoms.

5.

where R and Y are hydrocarbon radicals having 1–30 carbon atoms.

6.

where R and Y are hydrocarbon radicals having from 1–30 carbon atoms.

7.

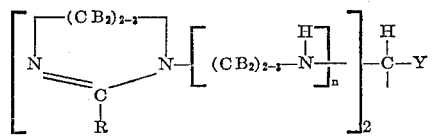

8.

References Cited in the file of this patent
UNITED STATES PATENTS

| | | |
|---|---|---|
| 2,468,163 | Blair et al. | May 9, 1950 |
| 2,640,029 | Blair et al. | May 26, 1953 |
| 2,707,185 | Suter et al. | Apr. 26, 1955 |
| 2,819,284 | Shen | Jan. 7, 1958 |
| 2,845,425 | Whitehead et al. | July 29, 1958 |